A. M. SONNICHSEN.
BUMPER.
APPLICATION FILED MAY 31, 1917.
1,315,428.  Patented Sept. 9, 1919.
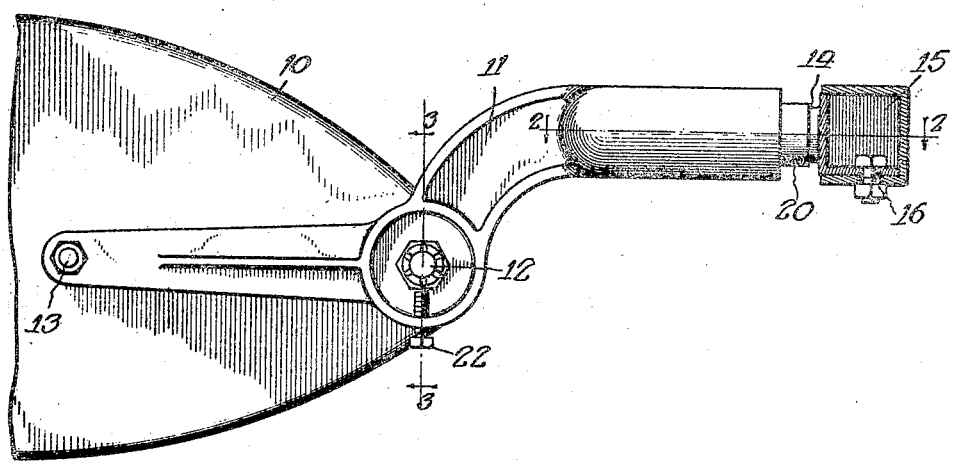
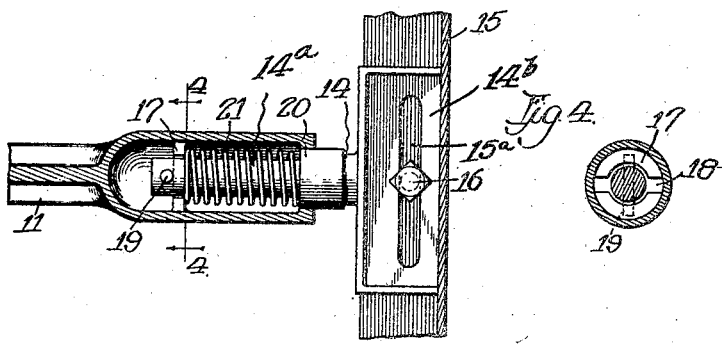
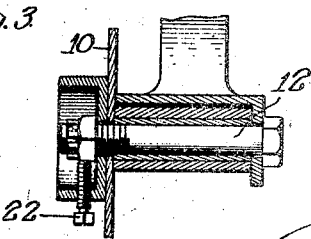

UNITED STATES PATENT OFFICE.

ANDREAS M. SONNICHSEN, OF CHICAGO, ILLINOIS, ASSIGNOR TO PROTEX MANUFACTURING COMPANY, OF CHICAGO, ILLINOIS, A CORPORATION OF ILLINOIS.

BUMPER.

1,315,428.  Specification of Letters Patent.  Patented Sept. 9, 1919.

Application filed May 31, 1917. Serial No. 171,813.

*To all whom it may concern:*

Be it known that I, ANDREAS M. SONNICHSEN, a citizen of the United States, residing at Chicago, in the county of Cook and State of Illinois, have invented new and useful Improvements in Bumpers, of which the following is a specification.

My invention relates to bumpers for automobiles or other vehicles and is a modified form of the bumper covered by my co-pending application Serial No. 171,812, filed May 31, 1917, and has for its object the provision of a bumper which may be secured to an automobile having a splash pan fitted to the front of the side frame member.

A further object of the invention is the provision of a bumper that can be secured to the splash pan or any other plane vertical surface presented at the front of the vehicle so that the bumper brackets may be extended forward in a straight line and in a plane parallel to the horizontal plane of the vehicle, thus holding the bumper bar in such position that it will squarely meet any shock or thrust against it.

My invention will be further and better understood by reference to the following drawings in which—

Figure 1 is an elevation showing one of the brackets of the bumper in position on an automobile;

Fig. 2 is a sectional view on line 2—2 of Fig. 1 showing the manner of attaching the head portion to the bracket;

Fig. 3 is a sectional view on line 3—3 of Fig. 1; and

Fig. 4 is a section taken on line 4—4 of Fig. 2.

Referring now specifically to the drawings in which like reference characters refer to like parts throughout, 10 is the front portion of a splash pan in position on an automobile, with bracket 11 secured to the automobile side frame member by the bolt 12, which passes through the front end of the side frame member of the automobile and the front end of the spring and holds these parts together in the usual manner. The splash pan is also secured to the side frame member of an automobile at its front end by this same bolt 12, as shown in Fig. 3. The rear end of the bracket 11 is held in position by means of a bolt 13 which passes through the splash pan. The front end portion of the bracket 11 is cylindrical in cross section and has inserted therein a T-shaped member 14, the shaft portion $14^a$ of which extends into the cylindrical portion of the bracket and the head portion $14^b$ of which has a bumper bar 15 secured thereto by means of a bolt 16 and the bolt 16 passing through a hole in the bumper bar 15 and through the transverse slot $15^a$ in order to provide for the lateral adjustment of the bumper bar 15. The cylindrical portion of the bracket 11 has an annular shoulder 17 formed on the inside at its rear portion, a slot 18 being cut through the shoulder in order to provide for the insertion of the rear end of the shaft portion of the T-shaped member 14 which has a pin 19 inserted therethrough thus forming a locking joint for holding the member 14 in position. The shaft portion of the member 14 has an annular shoulder 20 near its front end in close fitting sliding contact with the inside front end of the cylindrical portion of the bracket 11, the member 14 thus being strongly and securely held in position yet capable of free horizontal movement. A coil spring 21 which fits around the shaft portion of the member 14 and which abuts against the annular portion 17 of the bracket 11, and the shoulder 20 on the shaft portion of the member 14 forms cushioning means for the bumper bar 15. A set screw 22 having threaded engagement with the flange portion of the bracket at the point where it is fastened to the automobile is screwed against the nut on the bolt 12 thus serving to hold the nut tight and preventing the bolt from becoming loose and rattling, or a cotter pin may be inserted through the bolt in the usual manner.

It will be understood of course that there are two bracket members one for each side of the machine and that when the device is to be applied to an automobile, the nuts will be removed from each of the bolts 12, and the brackets secured to the automobile. Each head member 14 is separately inserted into the cylindrical portion of the corresponding member 11 so that the pin 19 registers with the slot 18 in the shoulder 17, the rear end of the portion of the head member 14 being inserted through the slotted shoulder 17 and the head given a quarter turn, so that when the device is in normal position the pin 19 will abut against the rear surface of the shoulder 17. The bumper bar 15 is then secured to the heads of the members 14 by means of bolts 16 passing through holes in each end of the bumper 15 and through the slots in the head portions of the members 14. The bumper bar 15 is then moved vertically until the front portion of the members 14 and the bumper bar project forward in a plane horizontal to that occupied by the automobile as a whole, and a hole drilled through the splash pan to correspond with the hole in the rear end of the bracket 11. The bolt 13 is inserted therethrough so as to hold the bracket 11 securely in position.

A bumper bar circular in cross section or of any other shape may be provided, and the shape of the head of the member 15 changed accordingly so as to provide proper fastening means.

It will thus be seen that the device may be applied to an automobile with very little trouble and without alteration of any of the parts, except the drilling of holes through the splash pans on each side of the machine, and can be attached to the machine in such manner that shocks sustained by the bumper bar are transmitted to the frame of the machine in a straight line.

It will be understood that while I have shown and described a bumper having particular features of construction I do not wish to be limited thereby and that many changes and alterations could be made in the detailed construction without departing from the spirit or scope of the invention.

I claim:

1. The combination with an automobile having splash pans secured to the forwardly projecting portions of its side frames, of a bumper bar, brackets on the forward ends of which said bumper bar is mounted, said brackets being pivotally mounted upon the side frames of the automobile and each having a rearwardly projecting portion overlying the adjacent splash pan and means for rigidly securing the inner end of the rearwardly projecting portion of each bracket to the adjacent splash pan at a predetermined point to locate the bumper bar at the desired height.

2. The combination with an automobile having splash pans secured to the forwardly projecting portions of its side frames, of a bumper bar, brackets on the forward ends of which said bumper bar is mounted, said brackets being pivotally mounted intermediate their ends upon the side frames of the automobile and each having a rearwardly projecting portion overlying the adjacent splash pan and means for rigidly securing the inner end of the rearwardly projecting portion of each bracket to the adjacent splash pan at a predetermined point to locate the bumper bar at the desired height.

Signed at Chicago, in the State of Illinois, this 28th day of May, A. D. 1917.

ANDREAS M. SONNICHSEN.

Witnesses:
MILTON T. MILLER,
L. E. HANNEN.